United States Patent [19]

Kurata

[11] Patent Number: 4,467,517
[45] Date of Patent: Aug. 28, 1984

[54] TOOL CHANGER FOR FACING HEAD

[75] Inventor: Takeshi Kurata, Hiroshima, Japan

[73] Assignee: Mitsubishi Jukogyo Kabushiki Kaisha, Japan

[21] Appl. No.: 364,891

[22] Filed: Apr. 2, 1982

[30] Foreign Application Priority Data

Apr. 13, 1981 [JP] Japan .............................. 56-52934[U]
Oct. 29, 1981 [JP] Japan ................................. 56-173430

[51] Int. Cl.³ .......................... B23B 3/26; B23Q 3/157
[52] U.S. Cl. ........................................ 29/568; 82/2 E; 414/730
[58] Field of Search ................. 29/568, 26 A; 82/2 E; 414/730

[56] References Cited

U.S. PATENT DOCUMENTS

| | | | |
|---|---|---|---|
| 3,256,600 | 6/1966 | Swanson et al. | 29/568 |
| 3,620,109 | 11/1971 | Durr et al. | 29/568 |
| 3,789,501 | 2/1974 | Kurimoto et al. | 29/568 |
| 4,329,770 | 5/1982 | Kielma | 29/568 |

Primary Examiner—Z. R. Bilinsky
Attorney, Agent, or Firm—McGlew and Tuttle

[57] ABSTRACT

A tool changer, for a facing head mounted on the spindle of a machine tool and which supports at least one tool holder slidingly movable at right angles to the axis of the spindle, comprises a tool changer arm, a slide device turnably supporting the changer arm and movable itself at right angles to the axis of the spindle, and means elements for sensing the arrival of the tool holder into contact therewith so as to set the changer to the tool changing position.

2 Claims, 8 Drawing Figures

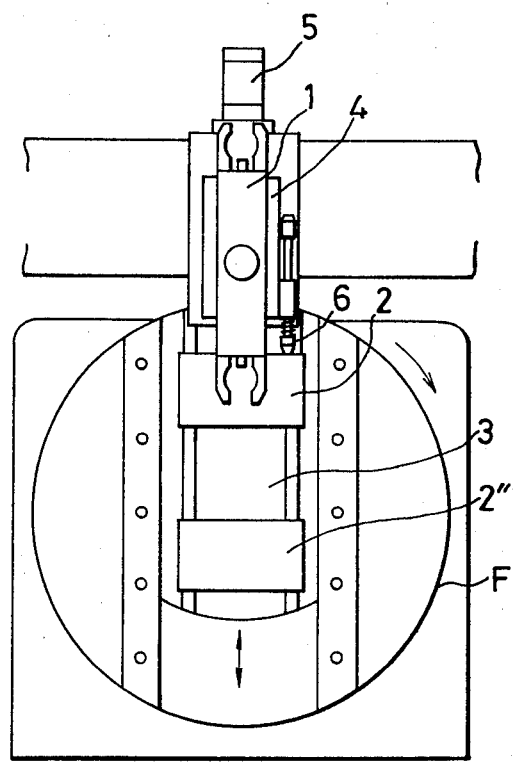
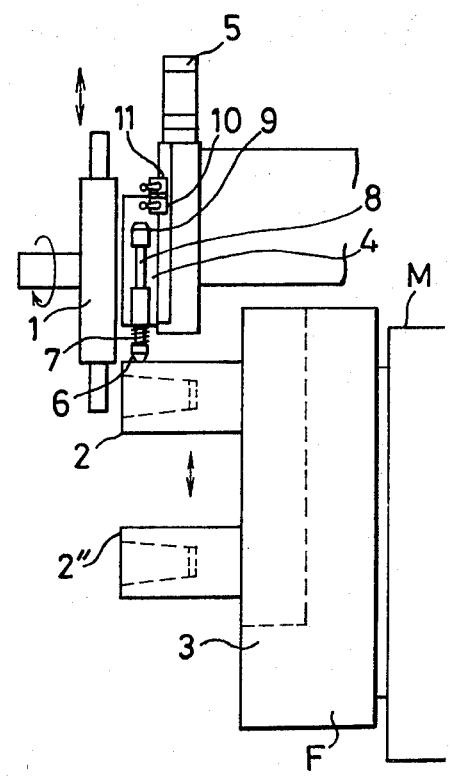
FIG. 5
FIG. 6

TOOL CHANGER FOR FACING HEAD

Field and Background of the Invention

This invention relates to an apparatus for automatically changing tools on a tool block or blocks secured to a slide adapted to slide across a face plate of a machine tool.

The automatic tool changer (ATC) of the prior art mounted on a conventional machining center or the like performs the exchange of tools by first positioning the main spindle of the machining center to a preset point, thereby bringing a tool on the spindle exactly to the changing point, and then moving a changer arm holding another tool exactly to a preset changing point.

The changer cannot function as such if the main spindle of the machining center is not accurately positioned in the preset point whenever a tool exchange becomes necessary.

Thus, when changing the tool held by a tool block secured to a tool slide movable across the face plate of a facing head, it is necessary that the tool block should return to a preset changing point and that the position of the tool block on the tool slide be accurately monitored for proper positioning. Achieving these ends, however, involves great mechanical difficulties. Moreover, it is difficult to reset the tool block precisely because of some almost inevitable deviation in phase during its movement to the tool changing point. This applies particularly to the case where two tool blocks instead of one are attached to the tool slide of the facing head in an attempt to broaden the machinable range without being restricted by the working stroke of the tool slide. In the latter case, accurate automatic tool changing is no longer possible.

SUMMARY OF THE INVENTION

In view of the difficulties with the prior art apparatuses as above explained, the present invention has as its object the provision of an apparatus capable of changing the tool which is held by a tool block on a face plate, by use of a simplified mechansim.

The invention resides, in essence, in a tool changer for the facing head of a machine tool wherein said facing head is mounted on a spindle and supports at least one tool holder which is made slidable at right angles to the axis of the spindle, said changer comprising a tool changer arm, slide means turnably supporting the changer arm and movable itself at right angles to the axis of the spindle, and means for sensing the arrival of the tool holder into contact therewith, said sensing means acting to set the changer to the tool changing position.

The invention will be better understood by reference to the following description taken in connection with the accompanying drawings showing preferred embodiments thereof.

BRIEF DESCRIPTION OF THE DRAWINGS

In the drawings:

FIG. 5 is a side view of another embodiment of the invention;
FIG. 6 is a front view of the second embodiment.

DESCRIPTION OF THE PREFERRED EMBODIMENTS

Figure 1:
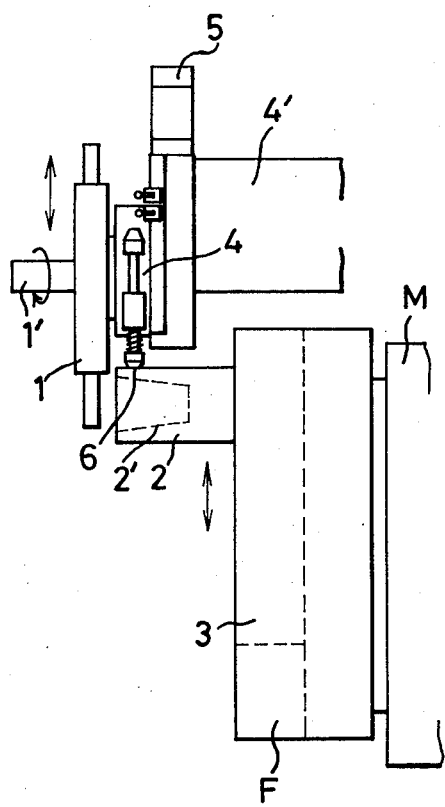
FIG. 1 is a side view of a tool changer for a facing head embodying the invention.

Referring now to the drawings, the symbol M denotes the main spindle head of a machine tool, including a spindle which carries a face plate F. On the face plate F is mounted a tool slide 3 which is slidable diametrally across the plate surface.

A changer arm 1 is attached to a changer slide 4 and is turnable around a spindle 1'. The changer slide 4 is mounted on a support 4' and is made vertically movable by a hydraulic cylinder 5. A tool block 2 has a tapered hole 2' formed axially inwardly to receive the shank of a tool. The block 2 is fixedly secured to the tool slide 3, which in turn is moved under numerical control. The block may be fixed to any desired point of the tool slide 3. To one side of the changer slide 4 is attached a sensor head 6 in such a manner that as the slide moves downwardly the lower tip of the sensor head 6 comes into contact with the tool block 2.

Figure 3:
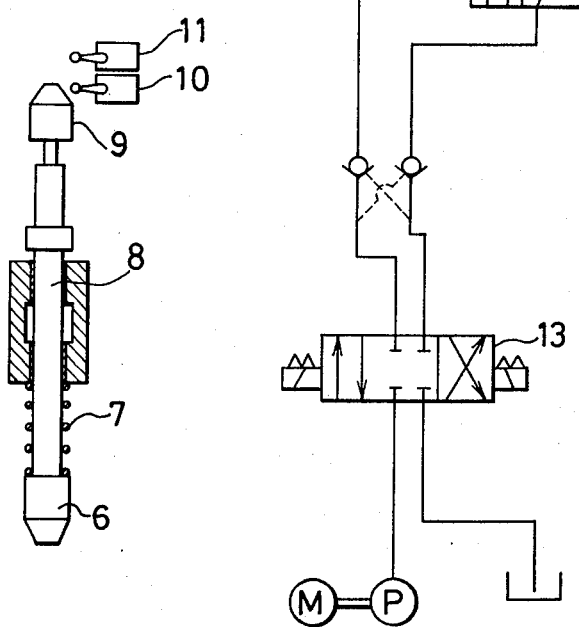
FIG. 3 is a detailed view of a sensor head.

FIG. 3 shows the sensor head in detail. It comprises a rod 8 normally biased to the lowermost position by a spring 7. The descent of the changer slide 4 brings the sensor head 6 into contact with the tool block 2, causing a relative rise of the rod 8. Consequently, a dog 9 on top of the rod first touches a deceleration sensor 10, enabling the latter to give this information and thereby operate the drives to reduce the speed of the descending slide 4. With a further descent of the changer slide 4 the dog 9 actuates a stop sensor 11, so that the slide 4 is stopped in position ready for tool changing.

Figure 4:
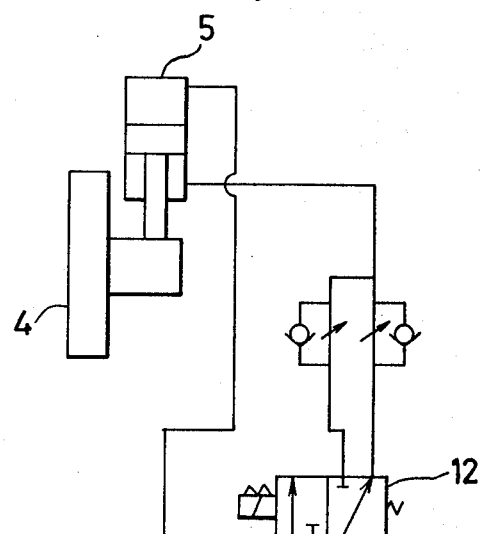
FIG. 4 is an oil hydraulic circuit diagram.

An oil hydraulic circuit for driving the hydraulic cylinder 5 to move the changer slide 4 upwardly and downwardly will now be explained in connection with FIG. 4. Upon receipt of the signal from the deceleration sensor 10, a solenoid-operated directional control valve 12 for deceleration works to make a circuit which includes a restriction for speed reduction, thus slowing down the descent of the changer slide 4. Further, in response to the signal from the stop sensor 11, another solenoid-operated directional control valve 13 for vertical movement is turned off to stop the changer slide 4. The circuit in this state is represented by the diagram in FIG. 4.

Thus, exchange of tools can be performed while the tool block 2 and the changer arm 1 are kept in the same relative position. The mechanism for tool changing is conventional and therefore is not further described here.

In accordance with the invention, as will be clear from the foregoing description, the position of the tool block 2 is directly monitored by the sensors to decelerate and stop the changer slide, and tools can be changed in disregard of the stop position of the tool block. Also, wherever the tool slide may be secured to the tool block, the tool changing is possible regardless of the slide location.

Figure 2:
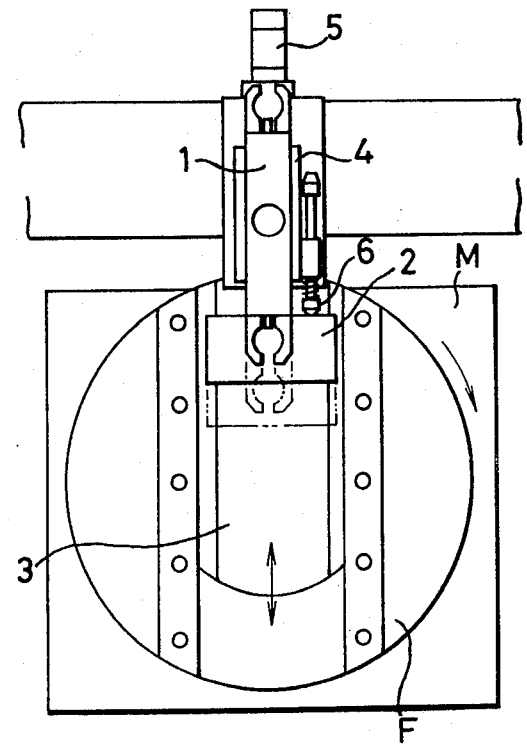
FIG. 2 is a front view of the changer.
Figure 7:
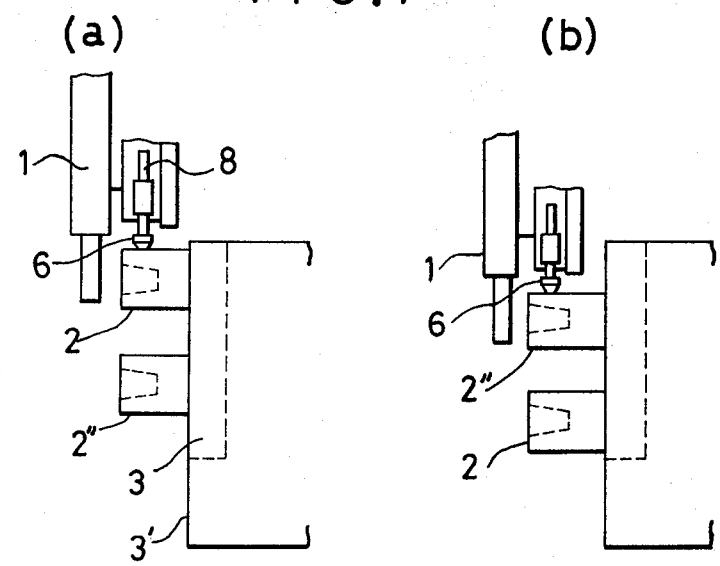
FIGS. 7(a) and (b) are views explanatory of the operation of the invention.

FIGS. 5 to 8 illustrate another embodiment of the invention. In FIGS. 5, 6 and 7 the symbols and numerals like those used in FIGS. 1 to 3 designate like or similar parts. This embodiment employs two tool blocks 2, 2" instead of one, but for the remainder of construction it is analogous to the embodiment of FIGS. 1 to 3.

The procedure for positioning the changer slide 4 with respect to the tool block 2 is, therefore, the same as with the first embodiment. As the changer slide 4 comes down, the sensor head 6 attached to the slide descends too, as shown in FIG. 7(a), until it comes in contact with the tool block 2. The rod 8 is normally biased to the lowermost position by the spring 7, and it rises relatively upon contact of the sensor head 6 with the tool block due to the descent of the changer slide 4. The relative rise of the head 6 is detected by the deceleration sensor 10, with the consequence that the descending changer slide 4 is slowed down. Further descent of the changer slide 4 causes the dog 9 to touch and actuate the stop sensor 11, with the result that the changer slide 4 is brought to a stop in position ready for tool changing. The same procedure is followed when the face plate 3' has been turned upside down, bringing the other tool block 2" to the tool changing position as shown in FIG. 7(b).

With the changer arm 1 and the positional sensing mechanism of the construction described above, the tool exchange is performed by effecting a 180°-turn of the face plate 3' to a preset position, directly sensing the positions of the two tool blocks on the tool slide by means of the sensing mechanism, and then bringing the changer arm to the tool changing position.

Figure 8:
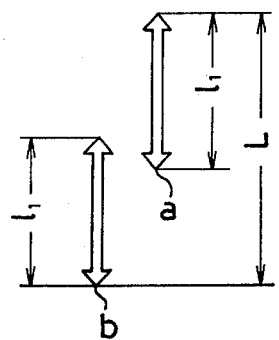
FIG. 8 is a diagram illustrating machinable ranges.

Thus, if the two tool blocks are installed in two different locations a and b, as indicated in FIG. 8, and made movable over a stroke $\lambda_1$ each by the tool slide, then an overall machinable range L, much broader than for a single tool block, can be provided. Consequently, the tool on either tool block can be automatically changed without any limitation due to the stroke of the tool slide or any need of detaching and refitting the particular tool block.

As described in detail above, the two tool blocks installed in different locations as desired on the tool slide in accordance with the invention provides a broader machinable range than in the part, without the necessity of tool block refitting. Because the face plate is turned through 180° and the positions of the two tool blocks are directly detected so as to decelerate and stop the changer slide, the tool on each block can be replaced with another one simply after the tool slide has been reset to the stroke end or original point, irrespective of the mounting position or stop position of the particular tool block. Moreover, the two tool blocks mounted on opposite sides of the center of rotation of the facing head effectively reduce the need of balancing the head.

What is claimed is:

1. A machine tool and changer combination, comprising:

a spindle head having a longitudinal axis;

a face plate connected to said spindle head, having a diameter extending at right angles to said longitudinal axis and rotatable about said longitudinal axis;

a tool slide slidably mounted on said face plate along said diameter and fixable at anyone of a plurality of radial positions on said face plate;

a tool block connected to said tool slide and movable therewith to said plurality of radial positions;

a changer support disposed adjacent said spindle head;

a changer slide slidably mounted in a linear direction on said changer support and parallel to said diameter of said face plate with said plate in a selected rotational position with respect to said longitudinal axis of said spindle head;

a sensing member slidably mounted on said changer slide in a direction parallel to said diameter of said face plate when said face plate is in said selected rotational position, said sensing member being movable by sliding movement of said changer slide, in a path which intersects said tool block with said face plate in said selected rotational position;

biasing means engaged with said sensing member for biasing said sensing member toward said tool block with said face plate in said selected rotational position;

a changer arm rotatably mounted to said changer slide and movable into a changing position for changing a tool of said tool block;

drive means connected to said changer slide for driving said changer slide to move said sensing member into engagement with said tool block with said face plate in said selected rotational position and to move said arm into said changing position; and a sensor connected to said changer block and engageable by said sensing member with movement of said sensing member due to an abutment of said sensing member with said tool block at any of said plurality of radial positions upon movement of said changer slide, said sensor connected to said drive means for stopping said drive means when said changer slide brings said changer arm into changing position.

2. A combination according to claim 1, wherein said sensor includes a deceleration sensor positioned to first engage said sensing member when said sensing member first abuts said tool block, and a stop sensor positioned to engage said sensing member only after said sensing member has engaged said deceleration sensor, said drive means having deceleration means connected to said deceleration sensor for decelerating movement of said changer slide and stop means connected to said stop sensor for stopping movement of said change slide.

* * * * *